W. T. PAYNE.
NUT LOCK.
APPLICATION FILED JUNE 14, 1909.

962,582.

Patented June 28, 1910.

Witnesses
M. F. McNeil
B. V. Purcy

Inventor
Willard T. Payne
By P. I. Elliott
Attorney

UNITED STATES PATENT OFFICE.

WILLARD T. PAYNE, OF TACOMA, WASHINGTON.

NUT-LOCK.

962,582.

Specification of Letters Patent. Patented June 28, 1910.

Application filed June 14, 1909. Serial No. 501,910.

*To all whom it may concern:*

Be it known that I, WILLARD T. PAYNE, a citizen of the United States of America, residing at Tacoma, in the county of Pierce and State of Washington, have invented certain new and useful Improvements in Nut-Locks, of which the following is a specification, reference being had therein to the accompanying drawing.

This invention relates to devices for preventing the nut of a bolt from turning so as to loosen the connection made therewith and yet to allow the nut to be turned to tighten the said connection.

The object of this invention is to provide such a device which will be cheap to manufacture, easy to apply, effective in action, and simple to remove when it is desired to unscrew the nut. I attain these objects by the devices illustrated in the accompanying drawing in which—

Figure 1:
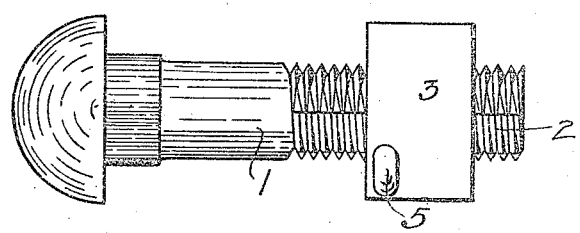
Figure 2:
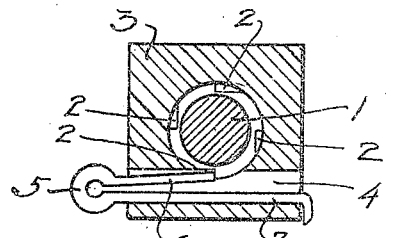
Figure 3:
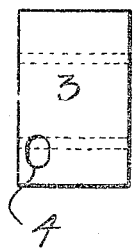

Figure 1 is an elevation of my improved bolt and nut lock; Fig. 2 is a cross-section thereof; and Fig. 3 is a side elevation of the nut.

Similar numerals of reference refer to similar parts throughout the several views.

As illustrated in the drawing, the bolt 1 has a series of longitudinal slits 2 made in the threads thereof, said slits having one edge radial and the other surface practically at right angles thereto so that they form a series of circumferential teeth about the bolt 1. The slits may extend entirely through the threads and into the body of the bolt when the threads are comparatively shallow. In the drawing four such slits are shown but the number thereof will vary with the circumstances. The nut 3 is provided at one side thereof with an elliptical in cross-section slot 4 passing therethrough. The position of this slot 4 is such that the part thereof nearest to the center of the nut intersects with the bolt hole in the nut. Into this slot is passed the spring split pin 5, one leg 6 of which has been cut short as shown in Fig. 2. The long leg 7 thereof is passed through the nut past the bolt and out of the slot such a distance that the short leg 6 will engage the bolt 1 so that if one of the slits therein comes in line with the said leg 6 the end of the leg will engage the radial side of the slit. The end of the long leg 7 is bent after it passes through the nut 3 so as to prevent the split pin from being drawn out of the slot. The spring action between the legs 6 and 7 keeps the long leg 7 pressed against the outer end of the elliptical in cross-section slot and the short leg 6 against the bolt. The action then of the spring pin is such as to prevent the nut from being turned on the bolt to unscrew it therefrom because the short leg of the pin acts as a ratchet dog against the circumferential teeth formed by the slits in the bolt.

To remove the nut from the bolt all that is necessary to do is to push the bent end of the long leg 7 toward the center a sufficient distance to allow it to enter the slot 4 and thus pull the pin out of the slot, thus removing all obstructions to the turning of the nut on the bolt. The slot is made wide enough to allow the short leg free action therein and high enough for the said short leg to engage the slits in the bolt. Sufficient room must also be left so that the said short leg can spring down under the pressure of the bolt threads when the nut is turned so as to screw the nut tighter on the bolt.

Having described my invention what I claim is:

In a nut lock, the combination of a threaded bolt; a series of circumferential teeth formed therein, one edge of the teeth being radial and the other surface at right angles thereto; a threaded nut fitting the threaded bolt and having a tangential slot therethrough, said slot being elliptical in cross-section and intersecting the bolt hole in the nut; and a spring split pin within the slot and having one leg shorter than the other leg and adapted to be held by the longer leg which passes through the slot and is bent over and beyond the marginal edge of the nut while the shorter leg is adapted to engage the circumferential teeth of the bolt to prevent the turning of the nut thereon except to tighten it thereon.

In testimony whereof I affix my signature in presence of two witnesses:

WILLARD T. PAYNE.

Witnesses:
CHAS. M. METZLER,
OLGA WING.